United States Patent [19]

Hicks

[11] 4,268,487

[45] May 19, 1981

[54] METHOD OF MINIMIZING MANGANESE DIOXIDE SLUDGE FORMATION

[76] Inventor: Manuel G. Hicks, 1927 S. 8th St., Omaha, Nebr. 68108

[21] Appl. No.: 101,636

[22] Filed: Dec. 10, 1979

Related U.S. Application Data

[63] Continuation-in-part of Ser. No. 947,360, Oct. 2, 1978, abandoned.

[51] Int. Cl.³ .............................................. B01D 53/34
[52] U.S. Cl. ..................................... 423/210; 423/224; 423/245; 423/242; 252/186; 422/4; 422/5
[58] Field of Search ................... 423/210 R, 242, 224, 423/235, 245, 219, 579, 326, 332, 599, 605; 252/188.3 R, 186; 422/4, 5

[56] References Cited

U.S. PATENT DOCUMENTS

| | | | |
|---|---|---|---|
| 2,427,708 | 9/1947 | Brimm | 423/579 |
| 2,683,074 | 7/1954 | Keuhner | 422/4 |
| 3,927,177 | 12/1975 | Okabe et al. | 423/235 |

FOREIGN PATENT DOCUMENTS 1152705  5/1969  United Kingdom ............ 423/245 R

*Primary Examiner*—Earl C. Thomas
*Attorney, Agent, or Firm*—Hiram A. Sturges

[57] ABSTRACT

The method for minimizing manganese dioxide sludge formation comprising: to a water solution of potassium permanganate adding the article of commerce called "silicate of soda" in sufficient quantity for causing a visible prevention of manganese dioxide sludge formation at times when the resultant solution comes into contact with oxidizable substances, as compared with the visible manganese dioxide sludge formation which occurs when said contact is made without said addition first having been made.

2 Claims, No Drawings

METHOD OF MINIMIZING MANGANESE DIOXIDE SLUDGE FORMATION

This application is a continuation-in-part of Ser. No. 947,360, filed Oct. 2, 1978, now abandoned and titled: Air Scrubber System with Lesser Sludge Formation and Disposable Waste, the inventor being Manuel Grant Hicks.

BACKGROUND OF THE INVENTION

This invention is for the primary purpose of providing potassium permanganate solutions with a greater ability to release oxygen.

This method is especially useful in causing greater amounts of oxygen to be released from a potassium permangamate solution than when the permanganate is used in a water solution in the conventional method of air scrubbing to remove pollution.

Heretofore, much of the oxidation potential of potassium permanganate in air scrubbing systems has been wasted by the loss of oxygen in a sludge to be disposed of. It is my discovery that much more of the oxygen in the potassium permangante can be liberated and taken up by the air if auxiliary chemicals are used with the potassium permanaganate as stated in the abstract hereof.

It is my belief that heretofore the silicates were never tried in combination with potassium permanaganate perhaps because no one ever thought of trying them because silicates are usually insoluble compounds, thereby giving silicates in general a seemingness of not being workable.

Many commercial silicates were among those that I tried, but they did not work because their formulas were not sufficiently unbalanced and "hungry" for acquisiting of a metal constituent.

The silicate I have found to be successful as a co-reactant of the second group is a readily available commercial solution of approximately 40% solution of sodium silicate of formula $Na_3Si_3O_7$ that is commonly called egg preserver.

To my knowledge, no one has ever tried sodium bisulfate in an air scrubber solution. Of course, it would not work without the permanganate compound.

I tested sodium bisulfite as a co-reactant of the second group, but it didn't prevent the waste of oxygen.

The history of air scrubbing with potassium permanganate began in the early part of this century, perhaps even in the last century, and engineers and chemists have always been trying to reduce the cost of air scrubbing. But, to my knowledge, through all of these many decades there has not been proposed an industrially acceptable way to scrub air any cheaper than with the oldest established method, potassium permanganate alone.

Permanganates have been used to oxidize polluted air for many years, usually in a wet scrubber system where the resultant absorbed polluted matter and waste manganate in the form of a solid insoluble residue as manganese dioxide accumulates. My invention is not concerned with what is oxidized or removed from the air, but has resulted in a need to improve the efficiency of the costly use of permanganate.

I have discovered that a common, easily obtainable article of commerce "silicate of soda", an alkaline solution containing mixtures of various sodium silicate compounds, can improve the oxidizing efficiency of the permanganates. A constituent having the formula $Na_2Si_3O_7$ is believed by me to be the active ingredient of my invention since the ratio of metal to silicate radical is low. In other words, the compound is "imbalanced" or deficient in metals and would, therefore, have a tendency to take on another metal, if in proper form and under proper conditions.

A British Patent to James william Abson et al, U.S. Pat. No. 1,152,705, issued May 21, 1969, and titled: Improvements in or Relating to the Treatment of Materials Comprising Compostible Organic Matter, is of interest, but I take exception to the general use of acidity. There are many types of acids, both organic and inorganic. Citric acid, an organic acid from citrous fruits, doesn't work in my process, since its manganese salt is insoluble, and therefore, produces a nuisance sludge which my invention teaches how to avoid. He uses sulfuric acid, a liquid which is dangerous and difficult to handle.

I teach the use of an acidic sodium sulfate salt which is a solid, can be handled more easily and safely, and is not as strongly acidic. The minimum amount used should be in excess of twice the equivalent molecular weight of the permanganate.

As regards the patent to Eugene O. Brimm, U.S. Pat. No. 2,427,708, issued Sept. 23, 1947, and titled: Chemical Production of Oxygen, I find little similarity to my teachings. I have found that in an aqueous air scrubber system, sodium metasilicate does not prevent the formation of a sludge as a co-reactant with permanganate. As mentioned, I add permanganate to the scrubber system, not manganate.

To produce oxygen with the process of Brimm, a high heat in the form of steam is necessary, which would be very expensive for a simple oxidation-reduction, as occurs to remove offensive odors in my process.

The efficient use of oxygen by my process at a plant depends on the proper operation of equipment.

The prevention of nuisance sludge formation by the use of my process, as claimed, is easily observed with the eyes.

In my opinion it is likely that sodium bisulfate has never been thought of as a possibility for use with potassium permanganate in scrubbing. This has been so even though sodium bisulfite has been used to clean up potassium permanganate waste material, the waste material being manganese dioxide, which is inert and useless. Sodium bisulfite and sodium bisulfate are both acidic and I believe there is a tendency not to consider acid compounds because of their corrosive effect on equipment, causing acid-resistant equipment to be necessary, which probably would usually be thought to be excessively expensive. However, I have discovered that sodium bisulfate can be used with the potassium permanganate and when this is done, the results are so valuable that the cost of acid-resistant equipment is very affordable after all. In fact, I've discovered that the cost benefits of a sodium bisulfate teamwork with potassium permanganate are enormous.

Sodium bisulfate has been used in the prior art to get rid of the manganese dioxide sludge so that it is disposed of, but wasted. I propose to prevent this waste this waste of the manganese dioxide sludge because it contains valuable oxygen which is excellent for oxidizing odors and thereby assisting the potassium permanganage in its job of oxidizing odors. The result is that the process I propose is more efficient cost-wise since it uses less potassium permanganate for a given amount of air scrubbing.

A further object of this invention is to provide a process which requires less maintainance of the equipment, specifically less clean-out is needed. In the prior art the manganese dioxide would foul up the scrubber and packing and valuable time would be needed to clean out the manganese dioxide. Such clean-out time is what is called as "down time". In other words, during this clean-out in the prior art the air scrubber is non-functional.

In the prior art extra containers for cleaning solution were an expensive part of a scrubbing system when sodium bisulfite was used. This also required an extra pump and extra expense. It is an object of this invention to eliminate that unnecessary extra expense.

A particular object is to provide a new process for this purpose which produces as useful both fertilizer and water. The importance of not wasting water is often overlooked. However, in any city there are persons glad to pay for water from a city to carry it by tank truck to needed locations.

My process also produces valuable fertilizer in various modifications of the process. For example, the chemical resultant product of reaction in this process with sodium silicate being a second co-reactant produces valuable fertilizer. Valuable fertilizer is also present in the resultant product when the second co-reactant is any one of the phosphates listed or potassium silicate, or any of the sulphates listed, or potassium itself. It seems to me that it is very important that the resultant product has such a needed use as fertilizing farm crops.

SUMMARY OF THE INVENTION

The goal of this invention is to provide a method for minimizing manganese dioxide sludge formation comprising: to a water solution of potassium permanganage adding the article of commerce called "silicate of soda " in sufficient quantity for causing a visible prevention of manganese dioxide sludge formation at times when the resultant solution comes into contact with oxidizable substances, as compared with the visible manganese dioxide sludge formation which occurs when said contact is made without said addition first having been made.

DESCRIPTION OF THE PREFERRED EMBODIMENT

My invention relates to a novel process of transforming a nuisance liquid or solid waste formed during a conventional air scrubbing process which uses large amounts of chemicals in a substantial quantity of water into useful substances such as suitable for reuse or recycle as a valuable nutrient and water source particularly on land, whereby the soil will have been improved for growing crops.

My invention is also concerned that if such waste materials are to be dumped into a sewer that the transformation is such that the newly formed mterials as a result of this invention will aid in the purification of the sewage on contact.

In particular my invention relates to improvements in the conventional air scrubbing where permanganates are used by selecting one of a second group of co-reactants which result in a more efficient release of oxygen, with only a minimum amount of heat or energy source needed, whose co-reaction during the oxidation process results in a desirable water solution. The co-reactants I propose are available and common materials of commerce.

I have discovered that a common, easily obtainable article of commerce "silicate of soda", an alkaline solution containing mixtures of various sodium silicate compounds, can improve the oxidizing efficiency of the permanganates. A constituent having the formula $Na_2Si_3O_7$ is believed by me to be the active ingredient of my invention since the ratio of metal to silicate radical is low. In other words, the compound is "imbalanced" or deficient in metals and would, therefore, have a tendency to take on another metal, if in proper form and under proper conditions.

Referring to a conventional scrubber system, the usefulness of this phenomena can be shown with equations (1) and (2):

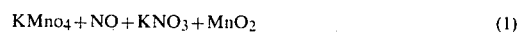

$$KMnO_4 + NO + KNO_3 + MnO_2 \qquad (1)$$

$$KMnO_4 + NO + \text{silicate solution} = KNO_3 + Na_2MnSi_3O_8 + \tfrac{1}{2}O_2 \qquad (2)$$

All reactants and resulting components in (2) are soluble and the loss of oxygen in the form of insoluble manganese dioxide is avoided.

Equation (1) represents a conventional use of the permanganate. Equation (2) shows that manganese monoxide has reacted to overcome the cation imbalance of the silicate and at the same time, has made available an extra atom of nascent active oxygen. This means, by comparing with equation (1, that 50% more oxygen is available for oxidizing, since as shown, two atoms of oxygen were needed to oxidize the "NO" to the stable nitrate form, $KNO_3$.

While I am unable to prove the exact formula of the $Na_2MnSi_3O_8$, claimed resultant component, the following illustration is an attempt to show a probable structure and its use as a co-reactant in the oxidation step. (See equation (2) above.

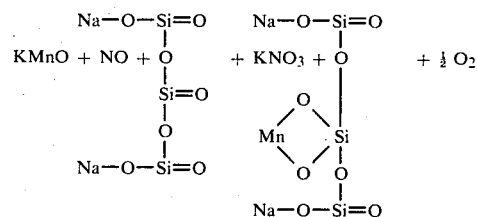

Manganese monoxide has reacted with the silicate to form a structurally stable "chelate".

Since each new supply or tank-load of the silicate solution purchased may contain a varying amount of the reacting material shown above, it may be desirable to test a small sample of the solution to determine the most economical or efficient amount to combine in solution with the permanate. It is essential that the silicate and permanganate be thoroughly dissovled and mixed in an aqueous solution to be used as a combined single component to absorb and oxidize odors.

A procedure for determining the desired ratio of permanganate to the "silicate of soda" solution to be combined as a single efficient oxidizing tool is illustrated by equation (3) below with all components dissolved in water.

$$Na_2SO_3 + KMnO_4 + \text{silicate solution} = Na_2SO_4 + \quad \text{equation (3)}$$
<center>purple</center>
$$KOH + MnNa_2Si_3O_8$$
<center>clear yellowish</center>

The sodium sulfite is used because it is a powder and is easy to work with. An excess is used for simplicity and an excess is easily determined by the change of color of the permanganate solution, that is, from a bright purple to a clear stable yellowish. If the proper amount of the silicate solution is present, no manganese dioxide oxygen loss will be formed. The exact amount of the permanganate used has to be measured while the volume of the silicate is matched by trial and error. Any convenient reducing substance besides the sulfite can be used, such as $NaNO_2$, $KCN$, etc.

If careful additions of the reducing substance is made to the permanganate-silicate solution, a color change from purple, through green to clear can be easily noted. The color change indicates that permanganate has been reduced to the green manganate, which is an oxidation-reduction step. Further oxidation breaks down the manganate with the release of two atoms of oxygen as is shown by equation (1) above, the equation also shows two atoms of oxygen is lost to an inert insoluble manganese dioxide sludge. Equation (2) shows that one extra atom or 50% more oxygen has been released for oxidation merely by the addition of a substance which costs considerably less than permanganate even though the active constituent of said substance may range in concentration near 20 to 30% in solution.

However, not shown in any of the equations, is the oxidation that occurs when the purple permanganate solution is transformed to a green solution of the manganate form by reducing substances in the total reduction of the permanganate solution. This can be illustrated in an alkaline aqueous solution according to equation (4) below.

$$2KMnO_4 + KOH + Na_2SO_3 = K_2MnO_4 + KHMnO_4 + Na_2SO_4 \quad (4)$$
<center>purple          Green     Green</center>
<center>                Alkaline  acidic</center>

As shown above, with molecular equivalents of alkali and reducing substance, two molecules of six valent manganese is reduced to the more acidic five valent form. This five valent manganate form is acidic and, therefore, corrosive. It is because of this phenomena that either an excess of the alkaline silicate solution be added to the system to counter the acidity or supplemental source of another form of alkali should be added to insure against an acidic action.

If, on the otherhand, the scrubber system is resistant to acidity, and an acid system is being used, sodium acid sulfate (sodium bisulfate) is a convenient acid to use since it is a solid and, in powder form, can be easily managed. A sufficient quantity should be used to prevent the formation of manganese dioxide sludge. The optimum conditions for the polluted air oxidation aqueous system can be shown by equation (5) as follows:

$$2KMnO_4 = 5H_2S + 6N^aHSO_4 = 2KNa$$
$$SO_4 + 2MnSO_4 + 2Na_2SO_4 + 5S + 8H_2O \quad (5)$$

While the ratio of bisulfate to permanganate can be easily meausred (3 to 1), it is best to allow the "law of mass action" to prevail and use a slight excess of the cheaper material, the bisulfate, to give a good strong action.

Besides teaching a more efficient way to utilize permanganate for air scrubbing, the purpose of this invention is to teach that the resultant spent products resulting from the breakdown by the oxidation and breakdown of the permanganates are soluble. This allows easy disposal as haulable tankage and I recommend disposing on land. The silicate component is an excellent soil conditioner, while the other components such as sulfates and nitrates are plant nutrients.

If, however, the contents of the tankage are low in substances such as nitrate, which is a water pollutant, the contents of the tankage would be valuable as a coagulant in the treatment and purification of waste water. The silicates of various forms are known coagulants. The manganese sulfates have been demonstrated in the laboratory to precipitate phosphate from an aqueous solution.

The conventional air scrubber system, such as used to deodorize air from a packing house waste water purification process uses potassium permanganate plus an alkaline substance such as sodium carbonate or sodium borate. After substantial amounts of manganese dioxide sludge had formed, sodium bisulfite has been used in the prior art to remove any encrusted sludge that could not be removed by the ordinary flushing process. The total amount of chemicals used, particularly an amount needed to oxidize strongly odorous packing house processing, becomes very expensive.

Since large amounts of the permanganate were in stock, an economic solution to the problem would be to find a second group co-reactant also in large supply. Soon I discovered 55 gallon drums of a "silicate", a complex of which the exact structure has not been established.

When these two chemicals were brought together in a substantial quantity of water and in approximately equivalent amounts and exposed to the polluted air as simulated in the laboratory, strong oxidation occurred immediately leaving no precipitation. To further evaluate the manganese silicate, meta silicate of a more exact formula was purchased and the test repeated. The immediate formation of a brown precipitate indicated a complexing type reaction is, therefore, needed.

The use of the complex silicate allowed large quantities of the oxidant to remain in solution for a long and convenient length of time, destructing by oxidation only in proportion to the amount of pollute exposure.

If a sulfate or acidic solution is desired, sodium bisulfate (not to be confused with the afore-mentioned bisulfite) was found to be conveniently easily managed. While it is not a complex chemical, its reaction with the breakdown products of the permanganate form soluble compounds.

As mentioned above, the use of a meta silicate and the use of steam, which would also be an added expense, is not desirable.

The state-of-the-prior art is concerned with "air scrubbing" technique for purifying polluted air. In so doing, a polluted water and/or a solid waste disposal problem is created.

My invention is to solve this problem of disposal while at the same time improving the efficiency of the art when permanganates are used as an oxidant.

Briefly, my combinations of two groups of chemicals improve on the prior art to allow more efficient oxidation, minimal sludge formation, and improvement in the nutrient quality of the resultant solution as a water source for agricultural use.

If the system needs to be recharged by replacing fresh oxidant and the solution needs to be disposed of by discharging to a sewer, a modification of the scrubber system will have to be done, since the highly nutrient solution may be in violation of an "industrial waste ordinance". Therefore, to minimize the amount of potassium and phosphate finding their way into streams and rivers and whose concentration levels in sewage plant effluents are a concern of regulatory agencies, the following modifications of the art are proposed as follows:

To sodium permanganate in water solution is added silicate of soda solution with water, a commercial solution containing a complex formula, with or without "$H_2O_2$-in-water-solution" added to the mixture.

After the permanganate has completely destructed, the resulting manganese complexes in solution will aid in coagulation or organics and the removal of simple phosphate molecular structure from the sewage water when the scrubber waste water is added to the sewage allowing the manganate compounds to come in contact with the soluble matter contained in the sewer water.

Another convenience of my process is the ease or simple way in which tanks and other equipment which comes in contact with permanganates can be cleared of any accumulated sludge. Manganese dioxide staining incrustation or sludge and manganate color can be quickly dissolved or color made merely by adding hydrogen peroxide to a solution in contact with the dioxide which contains in said solution an excess or sufficient amount of the acid or complex silicate to react with the sludge to form a solution. The peroxide reaction is fast and should, therefore, be added with good stirring of said solution with contact.

Care must be taken when adding the peroxide since it will destruct with explosive action if it come in contact with dry solids which could result in an injury. A violent boiling action will also occur if an insufficient amount of acid or silicate is in solution.

A simple pH meter reading can aid in determining if said solution is sufficiently alkaline or acidic.

Manganese dioxide $MNO_2$ sludge waste from air scrubbing is ecologically bad when added to the environment. It can contaminate ground waters causing poor flavor and odd taste, and it can cause distorting of clothing which such water is used in washing. $MnO_2$ sludge waste can cause fire if in contact with combustibles and heat or friction.

The purpose of this report is to discuss and tabulate new methodology discovered in this field and the data both of plant scale testing and laboratory accumulated data. In practice a 2% w/w of potassium permanganate is added to 800 gallons of water and the resulting solution is sprayed into an upward flow of the polluted air before it is vented to the surrounding air. The following table shows this oxidizing potential loss for each typical day.

TABLE I

| Date | Potential Oxygen | Oxygen Loss | pH |
|---|---|---|---|
| 4/23/75 | 4,180 PPM | 1140 PPM | 7.94 |
| 4/24/75 | 2,740 PPM | 1000 PPM | 8.39 |
| 4/25/75 | 1,740 PPM | 1600 PPM | 8.60 |
| 4/28/75 | 140 PPM | 140 PPM | 8.84 |
| 4/29/75-solution clear | | | 8.84 |

The above losses shown in parts per million as oxygen used represents the loss contained in the precipitation loss in the formation of the manganese dioxide sludge and the oxidation odors.

The formation of the sludge is not only an expensive oxygen loss but is a nuisance as it creates a sludge disposal problem. It was discovered that a commercial solution of sodium silicate not only supplied alkalinity but a sufficient amount of it would prevent the formation of the manganese dioxide sludge during either an oxidation or reductive chemical breakdown of the permanganate.

In spite of the fact permanganate has a total of 9 potential oxidation equivalents, only 5 are utilized in oxidizing pollute as based on its ability to oxidize or release 5 atoms of single equivalent iodine. In other words, 5 pounds of permanganate would utilize only 3 pounds to oxidize pollute while 2 pounds would be lost as stable, precipitated manganese dioxide.

As mentioned above, a commercial solution of approximately 40% sodium silicate, approximate formula $Na_2Si_3O_7$, was incorporated into the plantsair scrubber system to determine its feasibility and effectiveness in controlling the breakdown loss formation of the manganese dioxide sludge. Daily sampling of the scrubber solution was taken by plant personnel and brought to the laboratory for analysis.

The following table shows the results of the laboratory analysis of the scrubber performance under actual plant operations. Variations in continuity or apparent deviations in data are due to variations in plant operations and additions of fresh water to make up for losses due to evaporation, or possibly other unforeseen variable. However, a clear continuity of the system can be shown.

TABLE II

1% w/w (66.4 lbs.- half the amount previously used) plus 2 gallons of the silicate per hundred gallons resulting in a total of 16 gallons in the 800 gallon tank.

| Date | Potential Oxygen | Oxygen Loss |
|---|---|---|
| 8/12/75 | 3,320 PPM | 940 PPM |
| 8/13/75 | 2,380 PPM | 2340 PPM |
| 8/15/75 | 20 PPM | 20 PPM |

The scrubber system runs 24 hours a day 7 days a week. The above data shows a total of 3 days receiving complete or partial air deodorizing action as it passes through the spray of permanganate-silicate solution circulated in the scrubber tank. Table I shows 5 days for the 2% concentration or 2½ days on a 1% basis as compared to the 3 day for Table II.

The data suggests that a stronger silicate ratio to permanganate may be advantageous. Table III below shows the comparative data compiled from the results using a scrubber solution containing 1% potassium permanganate and 4 gallons of the silicate per 100-totalling 32 gallons in the 800 gallons of scrubber water.

TABLE III

| Date | Potential Oxygen | Oxygen Loss | pH |
|---|---|---|---|
| 2/23/76 | 3,020 PPM | 640 PPM | 10.96 |
| 2/24/76 | 2,380 PPM | 1,040 PPM | 10.67 |
| 2/25/76 | 1,340 PPM | 360 PPM | 9.62 |
| 2/26/76 | 980 PPM | 460 PPM | 9.35 |
| 2/27/76 | 520 PPM | 300 PPM | 9.15 |
| 3/1/76 | 220 PPM | 180 PPM | 9.06 |
| 3/2/76 | 40 PPM | 40 PPM | 9.06 |

TABLE III-continued

| Date | Potential Oxygen | Oxygen Loss | pH |
|---|---|---|---|
| 3/3/76-solution clear | | | 8.97 |

As mentioned earlier the life of the scrubber solution has been extended as predicted; giving a total of 8 days. Since a precipitate loss as manganese dioxide still is being formed it appears the ratio of permanganate to silicate should be higher with more silicate.

The increment increase to 6 gallons of the silicate in 100 of water to a total of 48 gallons (approximately one barrel full) in the total of 800 gallons of water, the volume capacity of the system, shows still further extension of the chemical usefulness. Table IV below shows a selection again of the most complete sampling and analysis of an approximate 1 to 6 ratio.

TABLE IV

| Date | Potential Oxygen | Oxygen Loss | pH |
|---|---|---|---|
| 3/10/76 | 2,600 PPM | 200 PPM | 9.81 |
| 3/11/76 | 2,400 PPM | 240 PPM | 9.38 |
| 3/12/76 | 2,160 PPM | 700 PPM | 9.26 |
| 3/15/76 | 1,460 PPM | 300 PPM | 9.17 |
| 3/16/76 | 1,160 PPM | 160 PPM | 9.12 |
| 3/17/76 | 1,000 PPM | 180 PPM | 9.00 |
| 3/10/76 | 820 PPM | 140 PPM | 9.07 |
| 3/19/76 | 680 PPM | — | 9.05 |
| | no more samples received | | |

Both the silicate and the permanganate add a certain amount of alkalinity which appears to be gradually lost as the system becomes more acidic which is caused by the introduction of carbon dioxide and the possible oxidation of organic matter to form acids. This alkalinity is necessary to react with the newly formed acids to neutralize them and to aid in holding them in solution if volatile, and to preserve any equipment that is not acid resistant that may be exposed.

As the permanganate moleculesis destructed during its oxidizing action, a stable, soluble, yellowish compound is formed by the reaction of the released manganese with the silicate. It is obvious that this reaction is more efficient and desirable than to have an oxidation loss by having two molecules of oxygen lost in a sludge in the form of manganese dioxide. Since some manganese dioxide is still being formed during the scrubbing process, the law of mass action dictates that the amount of silicate needed should be equal to the permanganate in combining power or preferably in excess.

Since the silicate was ordered by the barrel, simplicity dictates that the ratio of silicate to permanganate should be increased by using less permanganate with the fixed quantity of silicate. It was also considered that the silicate and the newly formed manganese silicate complex would be excellent coagulating substances which would aid solids removal at a sewage treatment plant when the spent or completely reacted scrubber solution was emptied into sewer system.

When the scrubber system was emptied for cleaning it was discovered that the coagulating power of the new compound caused a strong affinity for the plastic rosettes used as an aid in diffusing the odor laden air for better contact with the scrubber solution. This affinity caused a gradual accumulation until plugging became apparent and cleaning became difficult.

The solution to the problem was to select a reactant material of a more acidic nature, also most of the system was resistant to acid attack. With a little modification the whole system could be made completely acid resistant.

As permanganate breaks down due to its oxidizing action, it passes through the manganate form which is a strong acidic action. Without alkalinity or sufficient alkaline buffering action, the resulting solution can exert a high local corrosive action.

I have discovered that sodium meta-silicate does not save oxygen in this process when used for a chemical of the second group.

I have discovered that the commercially available chemical under the term "silicate of soda solution" will successfully serve as a co-reactant to save oxygen in this process.

The unbalanced "hungry" structure of $Na_2 Si_3 O_7$ looks like this:

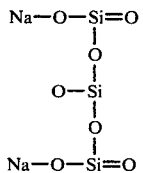

The unbalanced structure makes the center Si hungry so that it aids in the prevention of the formation of manganese dioxide sludge, and prevents waste of oxygen.

Quantities of co-reactants—The word "co-reactants" as used herein is a term commonly meaning that the chemicals that co-react are present in at least stoichiometrically adequate quantity; in other words, one molecule of reactant for each molecule of co-reactant.

However, I prefer that all of the co-reactants of the second group of co-reactants be present (by addition to the first oxidizer group of co-reactants, one or more chemicals) in ratio to the oxidizer in excess of stoichiometrically adequate quantity so that: (1) Variations in the amount of $Na_2Si_3O_7$ or other useful reacting substances, present but unknown in the "unbalances silicate" product commercially available will not accidentally cause a lesser than stoichiometric balance adequacy, and so that (2) such "excess" will cause a more efficient reaction.

The contaminants in the air to be treated by this process are any of the contaminants commonly removed from air by potassium permanganate, such as aldehydes, ketones, mercaptans, amines, hydrogen sulfide, sulfur dioxide, and phenol.

A sample chemical used as one of a first set of co-reactants is an unbalanced sodium silicate, having a silicate molecule no fully reacted with a metal constituent. I have found that a solution of sodium silicate sold commercially for use as an egg preserver worked very well to provide the unbalanced sodium silicate just previously mentioned. The commercial sodium silicate solution which was sold as an egg preserver was defined in a publication called "Merck Index". This publication is available in most city libraries and is well known to chemists. The definition of this solution in "Merck Index" is as follows: "Sodium Silicate Solution:—Sodium silicate solns of varying composition with respect to the ratio between sodium and silica, as well as of various densities, are available. One of the most commonly used sodium silicate solns, also known as "egg preserver," contains about 40% $Na_2Si_3O_7$. Solns of sodium silicate are strongly alkaline and are readily decomposed by acids with separation of silicic acid. The greater the ratio of $Na_2O$ to $SiO_2$ (the greater the alkalinity) the more tacky is the soln.

Use: For preserving eggs; fireproofing fabrics; as a detergent in soaps; an adhesive; waterproofing walls; in cements; in cold-water paints; manuf of abrasive wheels; weighting silk, etc."

In addition to the uses above mentioned the said solution of sodium silicate can be used for protection of floors and linings of barrels or tanks.

The main "contaminants" in manganese dioxide sludge are: (1) potassium and (2) manganese dioxide.

A typical reaction is as follows:

$$KMnO_4 + H_2O\ MnO_2 + KOH + 2O$$

The fact that $MnO_2$ is produced is significant. The original specification clearly states that it is a disposal problem.

Amounts of $KMnO_4$ or substitute chemical as an oxidizer needed is known to those skilled in the art so disclosure seems unnecessary.

Amounts of chemicals added by this process are calculable from the reactions in ways known to all chemists. The silicate used was $Na_2Si_3O_7$ in the opinion of the sellers thereof. That should be sufficient.

Economical recycling is achieved by the great reduction in wasted $MnO_2$ as compared with the prior art.

Addition to the system of another acid should not cause any problems.

The most economically available and easily managed acid and which gave a good simulated performance in the laboratory was sodium bisulfate which is an acid in solid form. For a trial run on a plant scale, it was roughly calculated to use 30 pounds of commercial grade potassium permanganate and 100 pounds of commercial grade sodium bisulfate dissolved together in the 800 gallons of water in the scrubber system.

The following table shows the data from a laboratory analysis of a daily sampling of a typical air scrubbing operation. The pH range of acidic solution was 1.7 to 1.91 which is strong by acidic.

TABLE V

| Date | Potential Oxygen | Oxygen Loss |
| --- | --- | --- |
| 6-7-77 | 3,220 PPM | |
| 6-8-77 | 1,660 PPM | 1,560 PPM |
| 6-9-77 | 1,480 PPM | 180 PPM |
| 6-10-77 | 760 PPM | 720 PPM |
| 6-11-77 | 620 PPM | 140 PPM |
| 6-12-77 | 780 PPM-concentrated due to evaporation | 120 PPM |

TABLE V-continued

| Date | Potential Oxygen | Oxygen Loss |
| --- | --- | --- |
| 6-13-77 | 660 PPM | 90 PPM |
| 6-14-77 | 570 PPM | 110 PPM |
| 6-15-77 | 460 PPM | 460 PPM |
| 6-16-77 - solution colorless | | |

Manganese dioxide sludge still formed inspite of the strong acidity. However, under this condition manganese dioxide will continue to oxidize certain substances or odors and will then react simultaneously with the acid to form soluble manganese sulfate. Since sampling could be done only at the bottom of the tank where the sludge collected, it was impossible to measure the rate of redissolving of the manganese dioxide. A tentative running time of a total of ten days has arbitrarily been set for a period of observation before the system is recharged.

The spent air scrubber solution now containing manganese sulfate is also an excellent coagulating substance and can aid in the precipitation or removal of phosphate from wastewater. If the air scrubber system is not located near a sewage treatment operation, both the silicate and sulfate solutions can be recycled on land as a source of tankage water and soil nutrients.

On soil that is too alkaline neutralization can be accomplished with the addition of the manganese sulfate solution. The manganese sulfate molecule is slightly acidic and both manganese and sulfur are needed for plant growth.

So the main embodiment of this invention is a method for minimizing manganese dioxide sludge formation comprising: to a water solution of potassium permanganate adding the article of commerce called "silicate of soda" in sufficient quantity for causing a visible prevention of manganese dioxide sludge formation at times when the resultant solution comes into contact with oxidizable substances, as compared with the visible manganese dioxide sludge formation which occurs when said contact is made without said addition first having been made.

I claim:

1. In a method of treating air containing gaseous oxidizable pollutants wherein the air is contacted with an aqueous scrubbing solution comprising potassium permanganate and wherein a manganese dioxide sludge is formed, the improvement comprising minimizing the formation of said sludge by incorporating into said scrubbing solution a sufficient quantity of a sodium silicate solution containing a substantial quantity of $Na_2Si_3O_7$.

2. The method of treating air containing gaseous oxidizable pollutants of claim 1 having said solution containing about 40% $Na_2Si_3O_7$.

* * * * *